US012599876B2

(12) United States Patent (10) Patent No.: US 12,599,876 B2
Carsten et al. (45) Date of Patent: Apr. 14, 2026

(54) PORT FOR MEMBRANE MODULE

(71) Applicant: Air Products and Chemicals, Inc., Allentown, PA (US)

(72) Inventors: Holger Walter Carsten, O'Fallon, MO (US); Kenneth M. Johnson, Saint Peters, MO (US); William Allen Updike, St. Louis, MO (US)

(73) Assignee: Air Products and Chemicals, Inc., Allentown, PA (US)

( * ) Notice: Subject to any disclaimer, the term of this patent is extended or adjusted under 35 U.S.C. 154(b) by 607 days.

(21) Appl. No.: 18/080,003

(22) Filed: Dec. 13, 2022

(65) Prior Publication Data

US 2024/0189776 A1     Jun. 13, 2024

(51) Int. Cl.
B01D 63/02 (2006.01)

(52) U.S. Cl.
CPC .......... B01D 63/02 (2013.01); *B01D 2319/04* (2013.01)

(58) Field of Classification Search
CPC ............... B01D 63/02; B01D 2319/04; B01D 2313/02; B01D 2313/10; B01D 2313/20; B01D 2313/21
See application file for complete search history.

(56) References Cited

U.S. PATENT DOCUMENTS

| | | | | |
|---|---|---|---|---|
| 4,031,012 | A | * | 6/1977 | Gics ................... B01D 63/0222 96/8 |
| 4,781,831 | A | * | 11/1988 | Goldsmith .......... B01D 63/061 210/321.82 |

| | | | | |
|---|---|---|---|---|
| 4,876,012 | A | * | 10/1989 | Kopp ..................... B01D 65/02 210/644 |
| 4,990,251 | A | * | 2/1991 | Spranger ............ B01D 63/0231 210/321.89 |
| 6,074,559 | A | * | 6/2000 | Hahmann .......... B01D 63/0221 210/450 |
| 6,126,833 | A | * | 10/2000 | Stobbe ................... B01D 53/22 210/500.25 |

(Continued)

FOREIGN PATENT DOCUMENTS

CN         214425194 U   * 10/2021

OTHER PUBLICATIONS

"List of screw drives" Wikipedia published Dec. 9, 2019 accessed at <https://en.wikipedia.org/w/index.php?title=List_of_screw_drives &oldid=930019936#External_drives> (Year: 2019).*

*Primary Examiner* — Stephen Hobson
(74) *Attorney, Agent, or Firm* — Amy Carr-Trexler

(57) ABSTRACT

A membrane module including at least one sidewall, at least one end wall, and at least one interior volume between the at least one sidewall and the at least one end wall is described. At least one port assembly disposed on the at least one sidewall includes a port aperture in fluid flow communication with the at least one interior volume, extending substantially perpendicular to a longitudinal axis, through a lower port aperture portion and an upper port aperture portion. At least one fastener is adapted to draw an upper face of the upper port aperture portion toward a lower face of the lower port aperture portion and secure the upper face to the lower face, thereby causing an o-ring to be pressed against the other of the upper face and the lower face around an entire perimeter of an o-ring recess in which the o-ring is disposed.

20 Claims, 9 Drawing Sheets

(56)     References Cited

U.S. PATENT DOCUMENTS

| | | | | |
|---|---|---|---|---|
| 6,592,152 B1 * | 7/2003 | Nejigaki | B01D 65/00 | 285/298 |
| 7,717,983 B2 * | 5/2010 | Semmere | B64D 37/32 | 95/47 |
| 12,325,866 B2 * | 6/2025 | Nahmias | A01N 1/00 | |
| 2002/0003105 A1 * | 1/2002 | McEvoy | B01D 63/043 | 210/497.1 |
| 2002/0162455 A1 * | 11/2002 | Bikson | B01D 65/00 | 96/8 |
| 2010/0024649 A1 * | 2/2010 | Semmere | B64D 37/32 | 29/428 |
| 2010/0326278 A1 * | 12/2010 | Nakamura | B01D 63/0241 | 96/8 |
| 2011/0024342 A1 * | 2/2011 | Fujita | B01D 71/0281 | 210/184 |
| 2011/0100910 A1 * | 5/2011 | Johansen | B01D 69/02 | 210/500.21 |
| 2011/0233216 A1 * | 9/2011 | Hildwein | B01D 65/00 | 73/49.3 |
| 2011/0272889 A1 * | 11/2011 | Blum | B01D 65/003 | 277/316 |
| 2012/0304856 A1 * | 12/2012 | Kanetsuki | B01D 53/228 | 95/47 |
| 2013/0022510 A1 * | 1/2013 | Keshavan | C04B 35/19 | 95/55 |
| 2013/0071594 A1 * | 3/2013 | Bikson | F28D 7/024 | 428/36.9 |
| 2013/0280767 A1 * | 10/2013 | Kobayashi | C12M 47/10 | 435/115 |
| 2014/0084511 A1 * | 3/2014 | Ackland | B29C 39/10 | 264/277 |
| 2014/0339239 A1 * | 11/2014 | Kawai | B01D 61/10 | 220/590 |
| 2014/0360373 A1 * | 12/2014 | Peacos | B01D 63/02 | 96/10 |
| 2015/0165382 A1 * | 6/2015 | Lee | B01D 63/02 | 210/321.87 |
| 2015/0283315 A1 * | 10/2015 | Cho | A61M 1/3417 | 210/314 |
| 2016/0096143 A1 * | 4/2016 | Diaz Mesa | B01D 63/06 | 210/321.89 |
| 2016/0107125 A1 * | 4/2016 | Kobayashi | B01D 63/04 | 210/232 |
| 2016/0193570 A1 * | 7/2016 | Kobayashi | B01D 63/0222 | |
| 2016/0228822 A1 * | 8/2016 | Cao | B01D 63/046 | |
| 2016/0243496 A1 * | 8/2016 | Roussin-Bouchard | B01D 53/22 | |
| 2017/0001147 A1 * | 1/2017 | Kulkarni | B01D 63/02 | |
| 2017/0050148 A1 * | 2/2017 | Taniguchi | B01D 63/02 | |
| 2017/0095603 A1 * | 4/2017 | Cho | A61M 1/3417 | |
| 2017/0144109 A1 * | 5/2017 | Powell | B01D 67/0046 | |
| 2017/0282119 A1 * | 10/2017 | Su | B01D 69/04 | |
| 2017/0341029 A1 * | 11/2017 | Pigarev | B01D 63/04 | |
| 2017/0348643 A1 * | 12/2017 | Noguchi | B01D 63/061 | |
| 2018/0021732 A1 * | 1/2018 | Osmundson | B01D 65/003 | 210/321.6 |
| 2018/0229187 A1 * | 8/2018 | Fan | B01D 63/0241 | |
| 2019/0184085 A1 * | 6/2019 | Shieh | A61M 1/1627 | |
| 2019/0291056 A1 * | 9/2019 | Osmundson | B01D 71/05 | |
| 2020/0197867 A1 * | 6/2020 | Sirkar | C02F 1/447 | |
| 2021/0268429 A1 * | 9/2021 | van Amsterdam | B01D 63/02 | |
| 2021/0283553 A1 * | 9/2021 | Beck | B01D 63/0222 | |
| 2025/0177911 A1 * | 6/2025 | Kim | B01D 53/229 | |

* cited by examiner

PORT FOR MEMBRANE MODULE

BACKGROUND

Vessels known as membrane modules are well-known in the art and have many useful applications, including but not limited to gas separation and dehydration.

Membrane modules in the known art do, however, have some drawbacks. In keeping with a modular design, the permeate port and other ports may include port assemblies that are at least partially removably secured to the shell of the membrane module, which allows the port assemblies to be disassembled for repair or for parts to be replaced if needed. The port assemblies may include a separable upper port portion connected to a lower port portion, which may be integrally formed with a portion of the membrane module shell. Some port assemblies known in the art secure the upper port portion to the lower port portion via a retaining ring that extends into an annular retaining ring groove disposed on an interior wall of the lower port portion, such that the lower surface of the retaining ring contacts an upper surface of a lower flared connecting end of the upper port portion. An external side of the lower flared connector end includes an o-ring groove, which houses an o-ring that seals the upper port portion against an interior wall of the lower port portion beneath the retaining ring groove. One drawback to this type of securement mechanism is that the retaining ring is prone to failure and can cause misalignment issues between the upper port portion and lower portion, which is detrimental to the performance of the port assembly. This is due to the retaining ring allowing the upper port portion to be rotatable with respect to the lower port portion. Therefore, a membrane module or other vessel having improved port assemblies is desired.

SUMMARY

This summary is provided to introduce a selection of concepts in a simplified form that are further described in more detail below. This summary is not intended to identify key features or essential features of the invention, nor is it intended to be used to limit the scope of the invention.

Several aspects of the systems and methods of the invention are outlined below.

Aspect 1: A membrane module comprising:

a shell assembly comprising a shell, a feed end tubesheet connected to a first end of the shell, and a product end tubesheet connected to a second end of the shell;

a fiber bundle disposed within the shell, the fiber bundle comprising a plurality of hollow fibers extending through the feed end tubesheet and the product end tubesheet;

a feed inlet in fluid flow communication with the plurality of hollow fibers through the feed end tubesheet, the feed inlet and the feed end tubesheet being adapted to force a fluid entering the feed inlet through the plurality of hollow fibers to separate the fluid into a slow gas-rich non-permeate fluid and a fast gas-rich permeate fluid;

a product outlet in fluid flow communication with the plurality of hollow fibers through the product end tubesheet, the product outlet adapted to receive the slow gas-rich non-permeate fluid that flows through the plurality of hollow fibers;

a shell space located internal to the shell and external to the plurality of hollow fibers, the shell space extending between the feed end tubesheet and the product end tubesheet, the shell space adapted to receive the fast gas-rich permeate fluid that permeates through a plurality of fiber walls of the plurality of hollow fibers;

at least one shell-side port assembly disposed on an outer wall of the shell between the feed end tubesheet and the product end tubesheet, the at least one shell-side port assembly being in fluid flow communication with the shell space;

each of the at least one shell-side port assembly comprising a port aperture extending substantially perpendicular to a longitudinal axis and comprising a lower port aperture portion and an upper port aperture portion, the port aperture extending through the upper port aperture portion and the lower port aperture portion;

the lower port aperture portion comprising a lower face oriented substantially parallel to the longitudinal axis and surrounding the port aperture;

the upper port aperture portion comprising an upper face extending substantially parallel to the longitudinal axis and co-planar to the lower face;

an o-ring recess disposed in one of the lower face or the upper face, the o-ring recess being located radially outwardly from the port aperture and surrounding the port aperture;

an o-ring disposed in and protruding from the o-ring recess; and at least one fastener that is adapted to draw the upper face toward the lower face and secure the upper face to the lower face, thereby causing the o-ring to be pressed against the other of the upper face and the lower face around an entire perimeter of the o-ring recess.

Aspect 2: The membrane module of Aspect 1, wherein the at least one fastener comprises a plurality of fasteners.

Aspect 3: The membrane module of any of Aspects 1 or 2, wherein the upper face includes a plurality of upper fastener apertures extending therethrough, and the lower face includes a plurality of lower fastener apertures extending at least partially therethrough, wherein each of the plurality of fasteners is located radially outwardly from the port aperture, extends through one of a plurality of upper fastener apertures, and extends into one of the plurality of lower fastener apertures.

Aspect 4: The membrane module of Aspect 3, wherein each of the plurality of lower fastener apertures and each of the plurality of fasteners is threaded.

Aspect 5: The membrane module of any of Aspects 1 through 4, wherein the plurality of fasteners comprises at least three fasteners.

Aspect 6: The membrane module of any of Aspects 1 through 5, wherein the at least one shell-side port assembly is disposed inboard of at least one end cap of the shell assembly.

Aspect 7: The membrane module of any of Aspects 1 through 6, wherein the at least one shell-side port assembly comprises a pair of shell-side port assemblies.

Aspect 8: The membrane module of any of Aspects 1 through 7, wherein the at least one shell-side port assembly is disposed proximal to the feed end tubesheet in relation to the product end tubesheet.

Aspect 9: The membrane module of any of Aspects 1 through 7, wherein the at least one shell-side port assembly is disposed proximal to the product end tubesheet in relation to the feed end tubesheet.

Aspect 10: The membrane module of any of Aspects 1 through 9, wherein the at least one shell-side port assembly is adapted to provide an inlet for receiving a sweep gas therethrough.

Aspect 11: The membrane module of any of Aspects 1 through 10, wherein the at least one shell-side port assembly is adapted to provide an outlet for the fast gas-rich permeate fluid that permeates through a plurality of fiber walls of the plurality of hollow fibers.

Aspect 12: The membrane module of any of Aspects 1 through 11, wherein the upper port aperture portion has a diameter that is less than a diameter of the lower port aperture portion.

Aspect 13: The membrane module of any of Aspects 1 through 12, wherein the lower port aperture portion has a uniform diameter.

Aspect 14: The membrane module of any of Aspects 1 through 13, wherein the upper port aperture portion comprises an upper beveled edge, a lower beveled edge, and a middle portion between the upper beveled edge and the lower beveled edge, wherein the middle portion has a uniform diameter.

Aspect 15: The membrane module of any of Aspects 1 through 14, wherein an upper perimeter portion of the upper port aperture portion comprises a hexagonal perimeter.

Aspect 16: The membrane module of any of Aspects 1 through 15, wherein the shell assembly is tubular.

Aspect 17: A port assembly for a membrane module having a shell defining at least one interior volume, the port assembly comprising:

a port aperture extending substantially perpendicular to a longitudinal axis and comprising a lower port aperture portion and an upper port aperture portion, the port aperture extending through the upper port aperture portion and the lower port aperture portion, the lower port aperture portion comprising a lower face oriented substantially parallel to the longitudinal axis and surrounding the port aperture, the upper port aperture portion comprising an upper face extending substantially parallel to the longitudinal axis and co-planar to the lower face;

an o-ring recess disposed in either one of the lower face or the upper face, the o-ring recess being located radially outwardly from the port aperture and surrounding the port aperture;

an o-ring disposed in and protruding from the o-ring recess; and at least one fastener adapted to draw the upper face toward the lower face and secure the upper face to the lower face, thereby causing the o-ring to be pressed against the other of the upper face and the lower face around an entire perimeter of the o-ring recess;

wherein the port assembly is disposed on the shell and is fluid flow communication with the at least one interior volume.

Aspect 18: The port assembly of Aspect 17, wherein the at least one fastener comprises a plurality of fasteners.

Aspect 19: The port assembly of any of Aspects 17 and 18, wherein the upper face includes a plurality of upper fastener apertures extending therethrough, and the lower face includes a plurality of lower fastener apertures extending at least partially therethrough, wherein each of the plurality of fasteners is located radially outwardly from the port aperture, extends through one of the plurality of upper fastener apertures, and extends into one of the plurality of lower fastener apertures.

Aspect 20: The port assembly of any of Aspects 17 through 19, wherein the plurality of fasteners comprises at least three fasteners.

4

BRIEF DESCRIPTION OF THE FIGURES

The present invention will hereinafter be described in conjunction with the appended figures, wherein like numerals denote like elements.

DETAILED DESCRIPTION OF THE PREFERRED EMBODIMENTS

Figure 1:
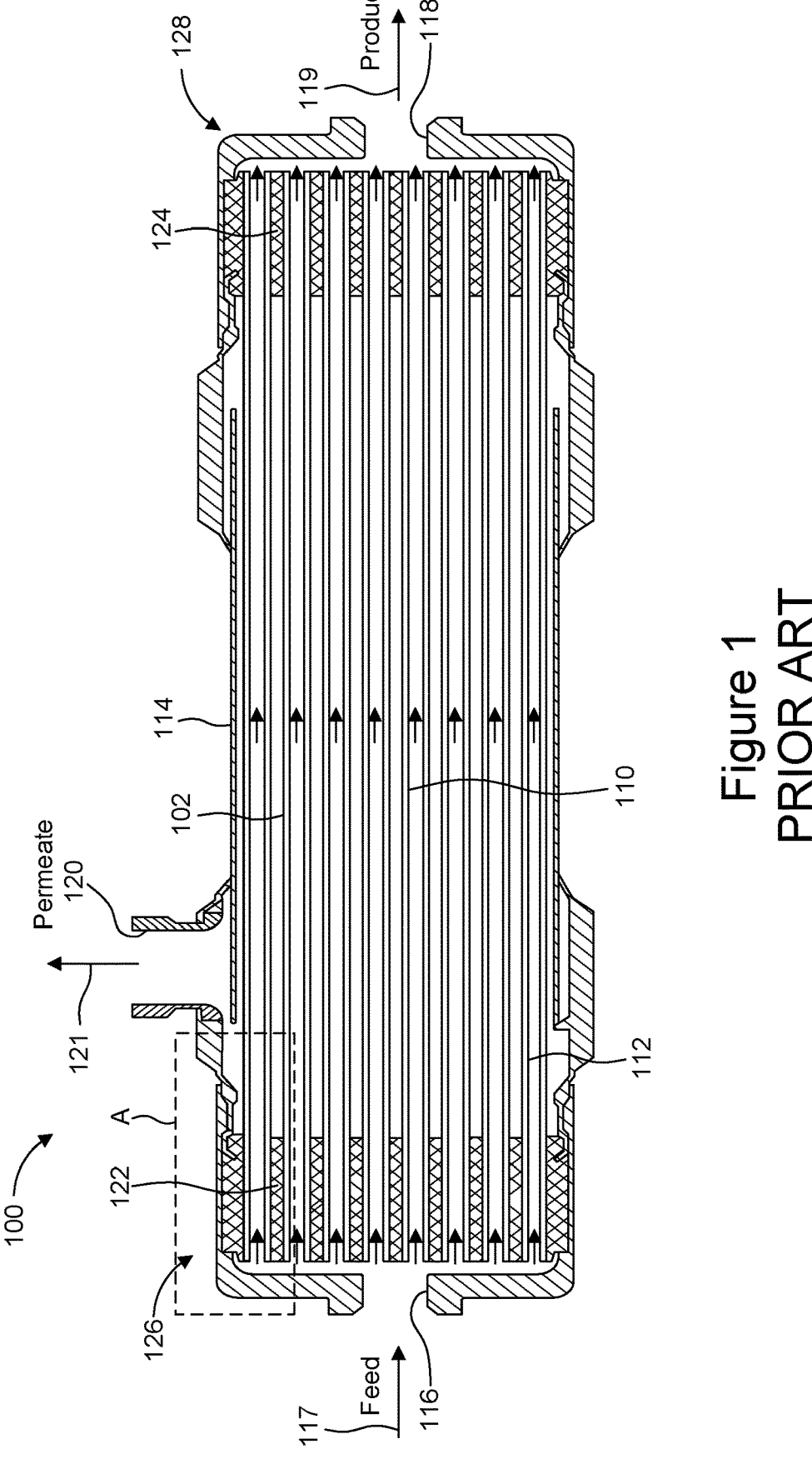
FIG. 1 is a cross-sectional side elevation view of a prior art membrane module.

The ensuing detailed description provides preferred exemplary embodiments only, and is not intended to limit the scope, applicability, or configuration of the invention. Rather, the ensuing detailed description will provide those skilled in the art with an enabling description for implementing the preferred exemplary embodiments of the invention. It should be understood that various changes may be made in the function and arrangement of elements without departing from the spirit and scope of the invention.

In order to aid in describing the invention, directional terms may be used in the specification and claims to describe portions of the present invention (e.g., upper, lower, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Unless otherwise indicated, the articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "vessel," as used in the specification and claims, refers to any hollow or substantially hollow container, including but not limited to a membrane module.

The term "fluid," as used in the specification and claims, refers to any material which is capable of flowing, which includes but is not limited to a liquid or a gas.

The term "conduit," as used in the specification and claims, refers to one or more structures through which fluids can be transported between two or more components of a system. For example, conduits can include pipes, ducts, passageways, and combinations thereof that transport fluids, including but not limited to liquids, vapors, and/or gases.

The term "port," as used in the specification and claims, refers to any aperture or opening in a structure through which a fluid may flow.

The term "inlet," as used in the specification and claims, refers to any port adapted for fluid flowing into an interior volume.

The term "outlet," as used in the specification and claims, refers to any port adapted for fluid flowing out from an interior volume.

The term "substantially perpendicular," as used in the specification and claims, refers to one object extending at approximately a 90-degree angle with respect to another object.

The term "substantially parallel," as used in the specification and claims, refers to one object extending at approximately a 180-degree angle with respect to another object.

As used in the specification and claims, the terms "flow communication," "fluid communication," or "fluid flow communication" are intended to mean that two or more elements are connected (either directly or indirectly) in a manner that enables fluids to flow between the elements, including connections that may contain valves, gates, tees, or other devices that may selectively restrict, merge, or separate fluid flow.

Unless otherwise stated herein, introducing a stream at a location is intended to mean introducing substantially all of said stream at the location. The stream may include any fluid stream. All streams discussed in the specification and shown in the drawings (typically represented by a line with an arrow showing the overall direction of fluid flow during normal operation) should be understood to be contained within a corresponding conduit. Each conduit should be understood to have at least one inlet and at least one outlet. Further, each piece of equipment should be understood to have at least one inlet and at least one outlet.

Referring to FIG. 1, a membrane module of the prior art 100 comprises a core 102 comprising a fiber bundle 110 which includes multiple open-ended hollow fibers 112 that extend along the length of a shell 114. The shell 114 includes a feed inlet port 116 through which a feed fluid stream 117 is fed, a non-permeate product outlet port 118 through which a non-permeate fluid stream 119 that flows through the open-ended hollow fibers 112 exits the membrane module 100, and a permeate fluid outlet port 120 through which a permeate fluid stream 121 that permeates across the open-ended hollow fibers 112 exits the membrane module 100. The bundle of hollow fibers can be held together at both ends by one or more tubesheets 122, 124 which may be made of thermoplastic or thermoset materials. Nonlimiting examples of tubesheet materials include cured epoxy or polyurethane-based formulations. One of the tubesheets 122 is located at a feed end 126 of the membrane module 100 (adjacent to the feed inlet port 116) and another tubesheet 124 is located at a non-permeate product end 128 of the membrane module 100 (adjacent to the non-permeate product outlet port 118). The permeate fluid outlet port 120 is located inboard of the feed end tubesheet 122 and typically no more than 1/3 of the distance from the inner edge of the feed end tubesheet 122 to the inner edge of the non-permeate product end tubesheet 124, in order to provide countercurrent flow between the permeate fluid stream 121 and the non-permeate fluid stream 119 separated from the feed fluid stream 117. The fibers 112 have semi-permeable walls that are intended to be permeable to the fast gases and less permeable to slow gases. Accordingly, when a feed fluid stream 117, comprising a mixture of slow and fast gases, flows through the fibers 112, the fast gas passes through or permeates the walls of the fibers 112 and flows through the permeate fluid outlet port 120 as permeate fluid stream 121, and the slow gas remains within the fibers 112 and flows to the non-permeate product outlet port 118 as non-permeate fluid stream 119. In the context of dehydration, the feed fluid stream 117 comprises a saturated gas stream, which results in water vapor permeating through the walls of the fibers 112 and flowing through the permeate fluid outlet port 120 while the remaining gases flow through and along the length of the fibers 112 to the non-permeate product outlet port 118.

Though not shown in FIG. 1, some membrane modules known in the art also include a sweep inlet port. in such modules, a sweep gas is injected on the permeate side at low pressure to increase the driving force for fast gas permeation at the non-permeate side of the membrane module. This sweep gas stream, which is fed to the permeate side through the sweep inlet port, is called the external purge, sweep, or inlet purge. The fast gas that permeates across the fibers 112 can be considered internal purge. The sweep gas stream and internal purge gas stream together make up the total purge that exits from the permeate fluid outlet port 120. A portion of the slow gas exiting the non-permeate product outlet port 118 can be used as the sweep gas, or a secondary source can be used.

Figure 2:
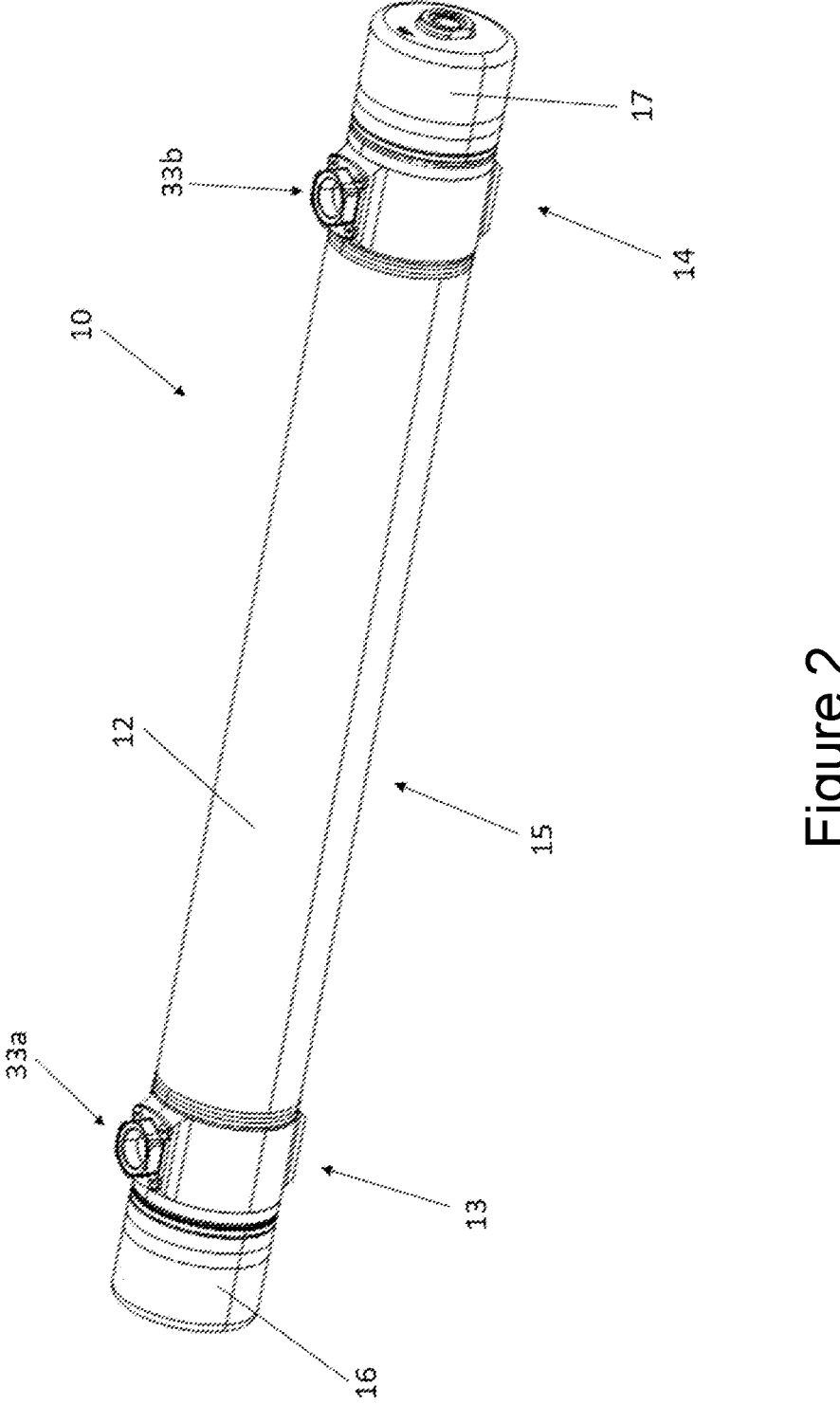
FIG. 2 is a perspective view of a membrane module according to the present invention.
Figure 3:
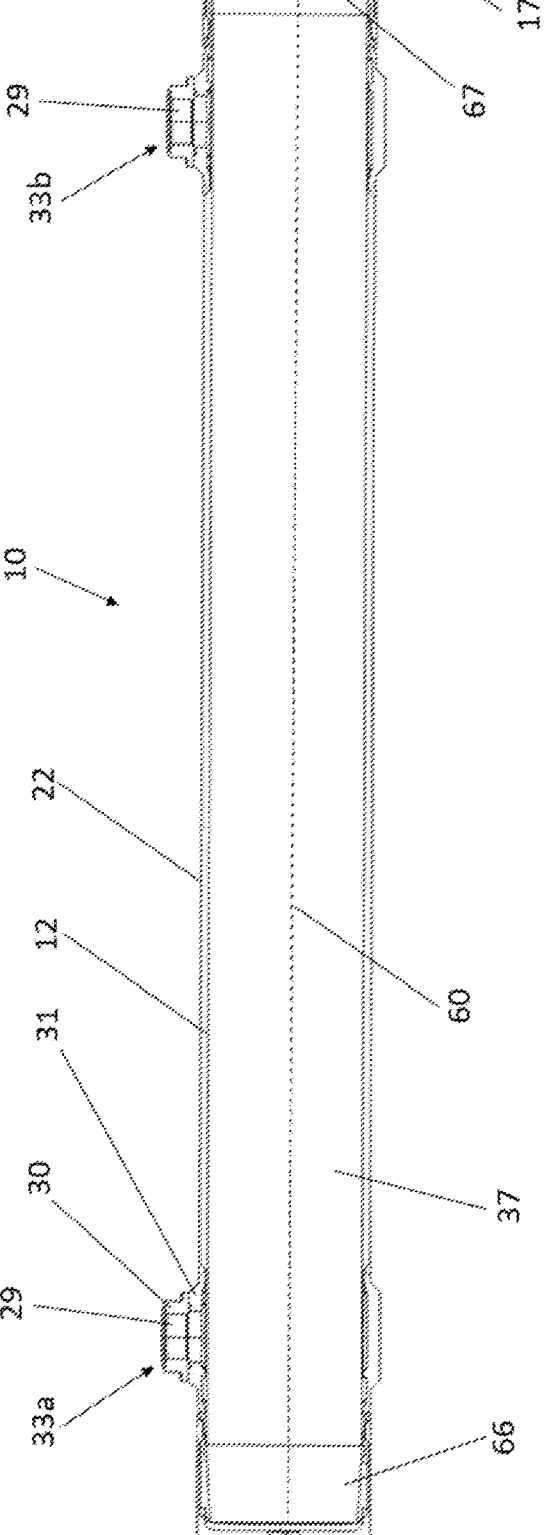
FIG. 3 is a cross-sectional side elevation view of a membrane module according to the present invention.
Figure 4:
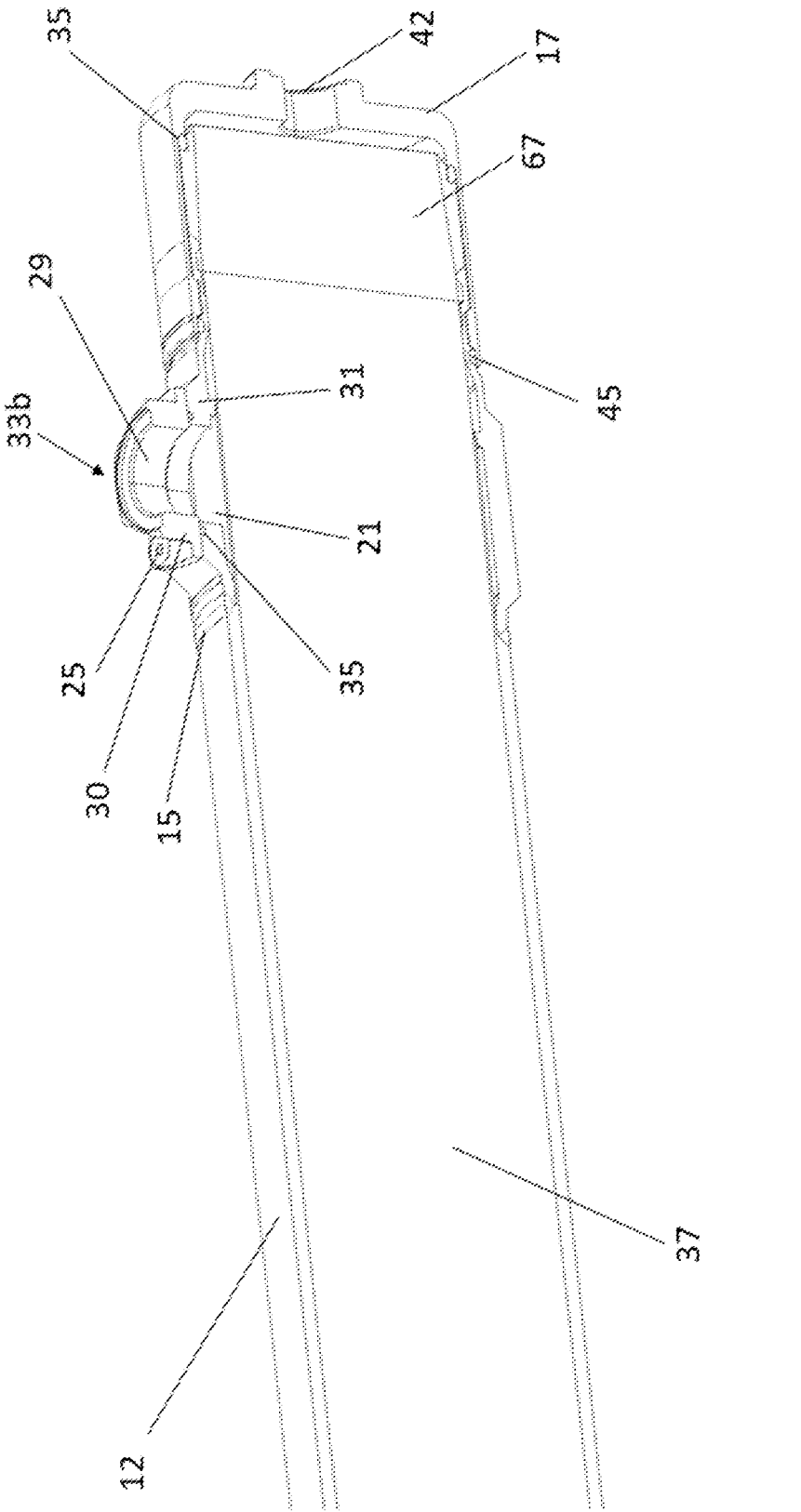
FIG. 4 is a cross-sectional perspective view of a membrane module according to the present invention.

Referring to FIGS. 2, 3, and 4, there is shown a membrane module 10, which comprises a shell assembly 15 including a shell 12, a feed end cap 16 connected to a first end 13 of the shell 12, and a product end cap 17 connected to an opposing second end 14 of the shell 12. In an illustrative example, the shell 12 may comprise materials such as aluminum, stainless steel, titanium, magnesium alloys, fiber reinforced plastics, or any other suitable materials. In the illustrated example, the shell assembly 15 is tubular in shape, but other shapes may be utilized in other examples.

The shell 12 houses the membrane element, which in the illustrative example comprises a fiber bundle 37 comprising a plurality of hollow fibers supported by a feed end tubesheet 66 and a product end tubesheet 67. In the illustrative example shown in FIG. 3, the feed end tubesheet 66 and product end tubesheet 67 are potted or otherwise cast in place, and are integral to the fiber bundle 37. In one illustrative example, the membrane module may utilize hollow fiber membrane units containing hollow fiber membranes made from polymers. Examples of polymers used to make hollow fiber membranes include, but are not limited to, polystyrene, polysulfone, polyethersulfone, polyvinyl fluoride, polyvinylidene fluoride, polyether ether ketone, polycarbonate, polyphenylene oxide, polyethylene, polypropylene, cellulose acetate, polyimides such as Matrimid 5218 or P-84, polyamide, polyvinyl alcohol, polyvinyl acetate, polyethylene oxide, polydimethylsiloxane, copolymers, block copolymers, or polymer blends. In an illustrative example, the hollow fiber membranes may be asymmetric with a nonporous layer or may contain a porous support with a nonporous coating. The coating may be applied to the inner or outer surface of the hollow fibers.

The feed end cap 16 and product end cap 17 may be secured to the first end 13 and second end 14 of the shell 12, respectively, via a threaded connection, a retaining ring, or any other suitable connection mechanism. The feed end cap 16 and the product end cap 17 cover each of the feed end tubesheet 66 and the product end tubesheet 67, respectively. In the illustrative example, the feed end cap 16 and the product end cap 17 are secured to the shell 12 via a crimping process. The feed end cap 16 at the first end 13 of the shell 12 comprises a feed inlet 27 in fluid flow communication with the plurality of hollow fibers of the fiber bundle 37 through the feed end tubesheet 66. The feed inlet 27 and the feed end tubesheet 66 are adapted to force a fluid stream entering the feed inlet 27 through the plurality of hollow fibers of the fiber bundle 37 to separate the fluid into a slow gas-rich non-permeate fluid and a fast gas-rich permeate fluid. The product end cap 17 at the second end 14 of the shell 12 comprises a product outlet 28 in fluid flow communication with the plurality of hollow fibers of the fiber bundle 37 through the product end tubesheet 67. The product outlet 28 is adapted to receive the slow gas-rich non-permeate fluid that flows from the feed inlet 27 through the plurality of hollow fibers.

As illustrated in FIG. 4, the membrane module 10 includes at least one shell-side port assembly 33*b* disposed on an outer wall 22 of the shell 12 between the feed end tubesheet 66 and the product end tubesheet 67. In the example shown in FIGS. 2 and 3, the membrane module 10 includes a pair of shell-side port assemblies 33*a*, 33*b*. Each shell-side port assembly 33*a*, 33*b* is in fluid flow communication with a shell space 31. FIG. 4 also shows the shell space 21 located internal to the shell 12 and external to the plurality of hollow fibers of the fiber bundle 37. The shell space 21 extends between the feed end tubesheet 66 and the product end tubesheet 67. The shell space 21 is adapted to receive the fast gas-rich permeate fluid that permeates through a plurality of fiber walls of the plurality of hollow fibers of the fiber bundle 37.

In the illustrative example, each shell-side port assembly 33*a*, 33*b* is disposed between the feed end tubesheet 66 and the product end tubesheet 67. A first shell-side port assembly 33*a* may be disposed proximal to the feed end tubesheet 66 in relation to the product end tubesheet 67. A second shell-side port assembly 33*b* may be disposed proximal to the product end tubesheet 67 in relation to the feed end tubesheet 66. The first shell-side port assembly 33*a* may be adapted to provide an outlet for the fast gas-rich permeate fluid that permeates through the plurality of fiber walls of the plurality of hollow fibers. In the illustrative example, the second shell-side port assembly 33*b* is adapted to provide an inlet for receiving a fluid stream comprising a sweep gas therethrough. The sweep gas increases the driving force at the non-permeate end of the membrane module, which enhances the gas separation performance of the membrane module 10. In the illustrated example, both shell-side port assemblies 33*a*, 33*b* are disposed inboard of the feed end cap 16 and the product end cap 17.

In the example shown in FIG. 4, each of the feed end cap 16 and the product end cap 17 is secured to the shell 12 by crimping the inner ends of the feed end cap 16 and the product end cap 17, forming the shell assembly 15. An x-ring 45 helps to seal the shell space 21 and protect against fast gas-rich permeate fluid leakage. In this example, each of the feed end cap 16 and the product end cap 17 includes an o-ring 35 which forms a seal against the product end tubesheet 67, ensuring that only the slow gas-rich non-permeate fluid flowing through the fiber bundle 37 will exit the product end tubesheet 67 as desired.

Figure 5:
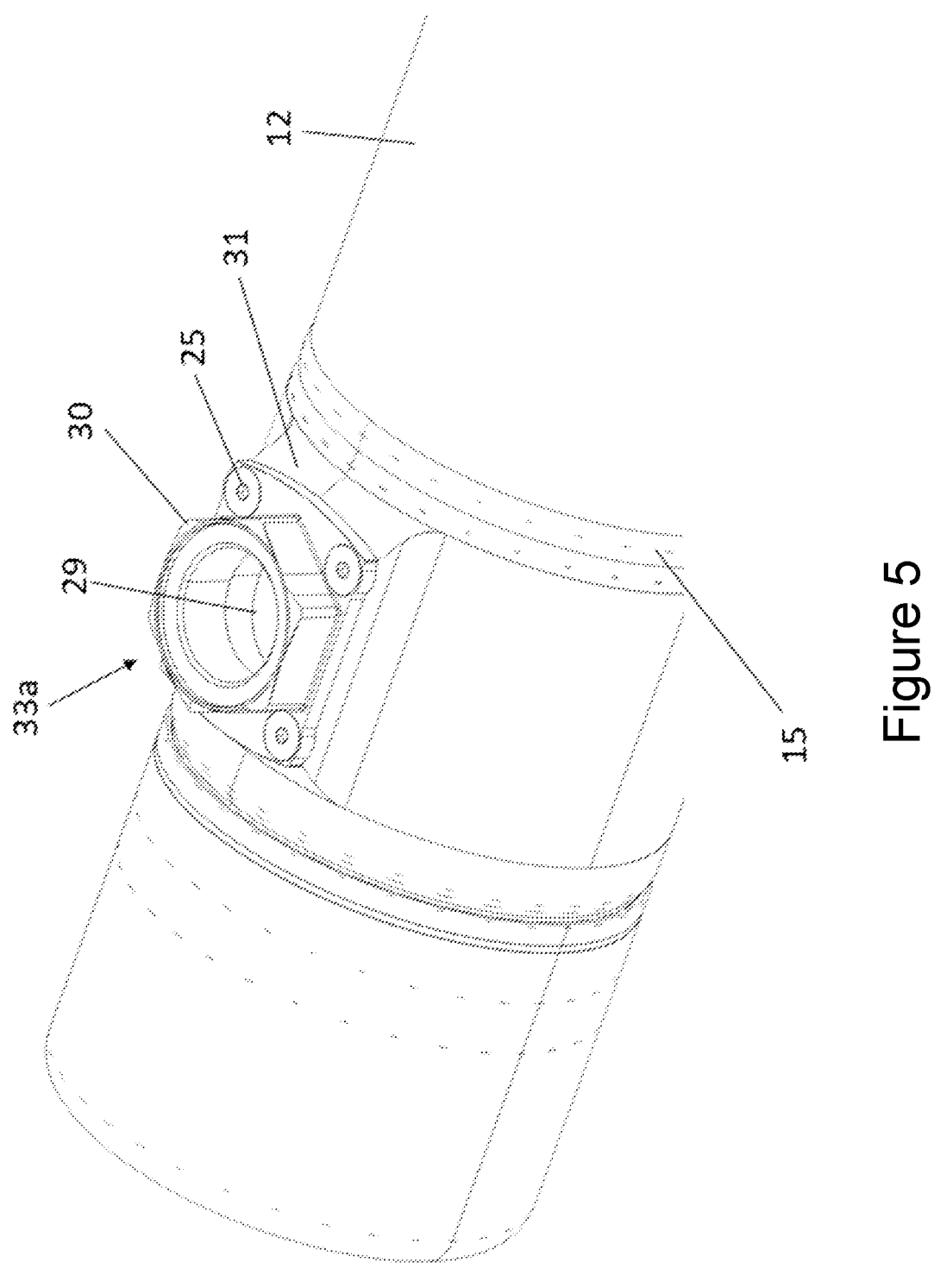
FIG. 5 is a perspective view of the feed end of a membrane module according to the present invention.
Figure 6:
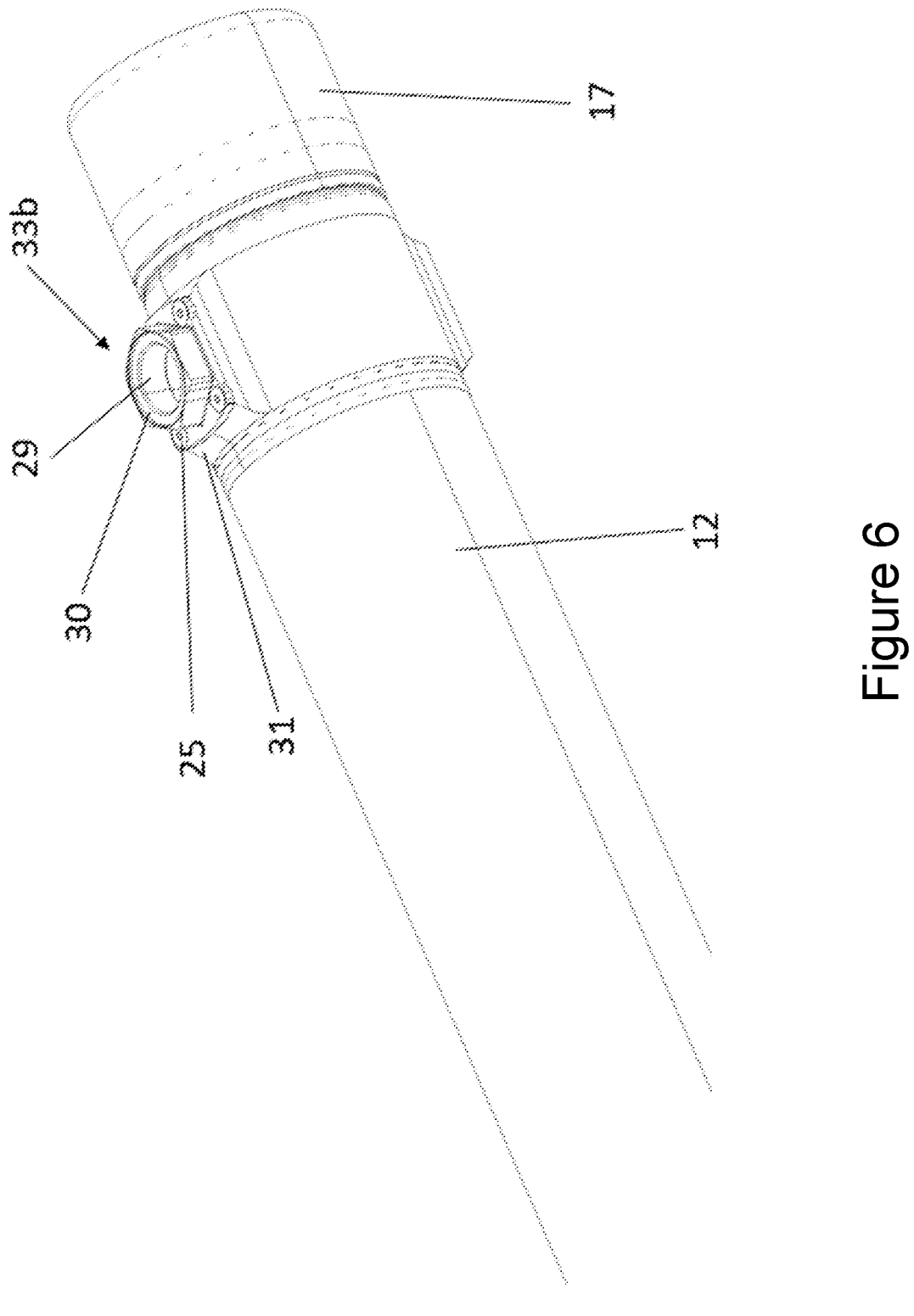
FIG. 6 is a perspective view of the product end of a membrane module according to the present invention.

Referring to FIGS. 5 and 6, a perspective view of the feed end of a membrane module and a perspective view of the product end of a membrane module are shown, respectively. Each of the shell-side port assemblies 33*a*, 33*b* comprises a port aperture 29 which is in fluid flow communication with the shell space. As illustrated in FIG. 3, the port aperture 29 extends substantially perpendicular to a longitudinal axis 60, which itself extends between the feed end cap 16 and the product end cap 17 along a longitudinal length of the membrane module 10. The port aperture 29 of each shell-side port assembly 33*a*, 33*b* comprises a lower port aperture portion 31 and an upper port aperture portion 30, whereby the port aperture 29 extends through the upper port aperture portion 30 and the lower port aperture portion 31.

Figure 7:
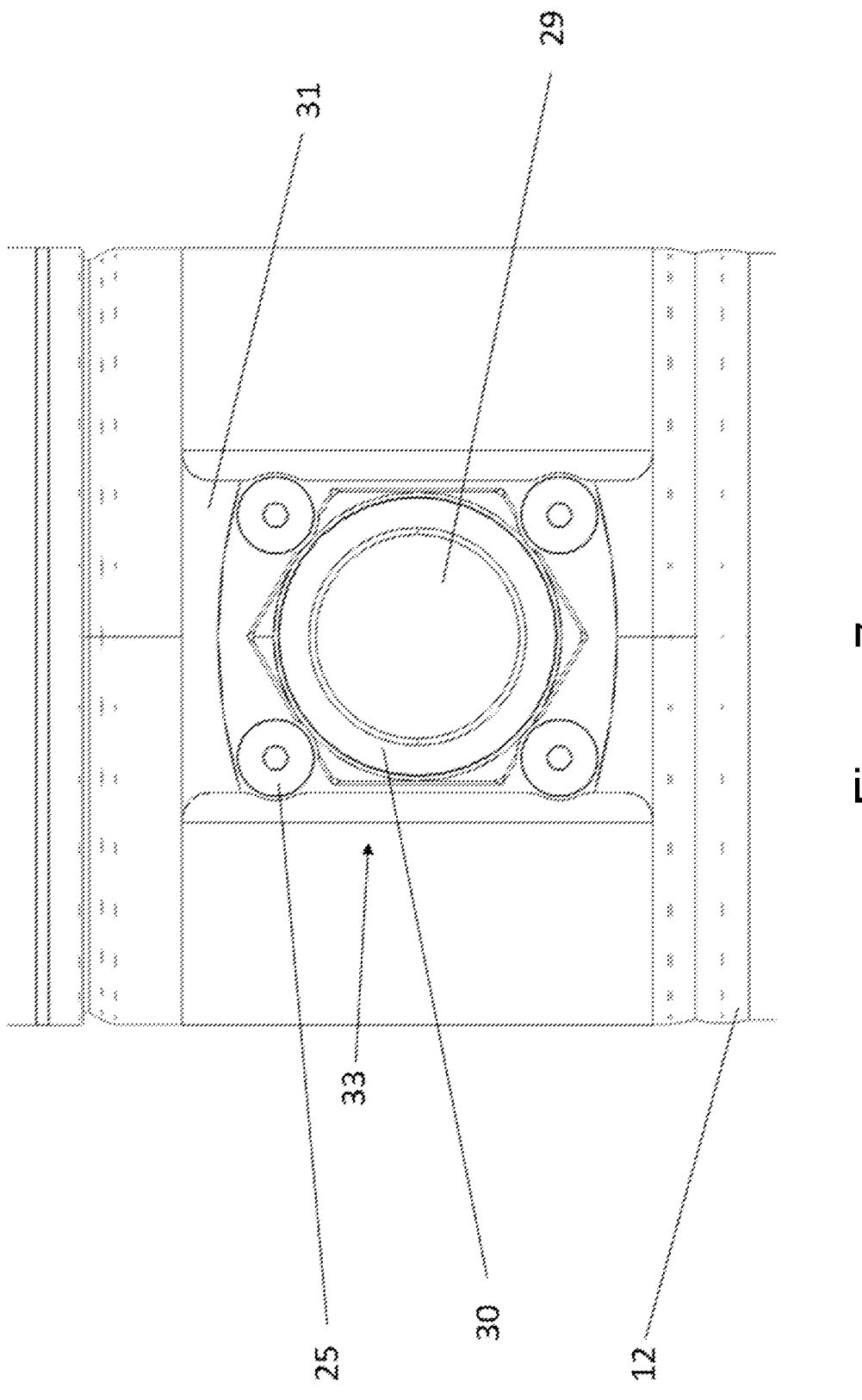
FIG. 7 is a top plan view of a port assembly of a membrane module according to the present invention.
Figure 8:
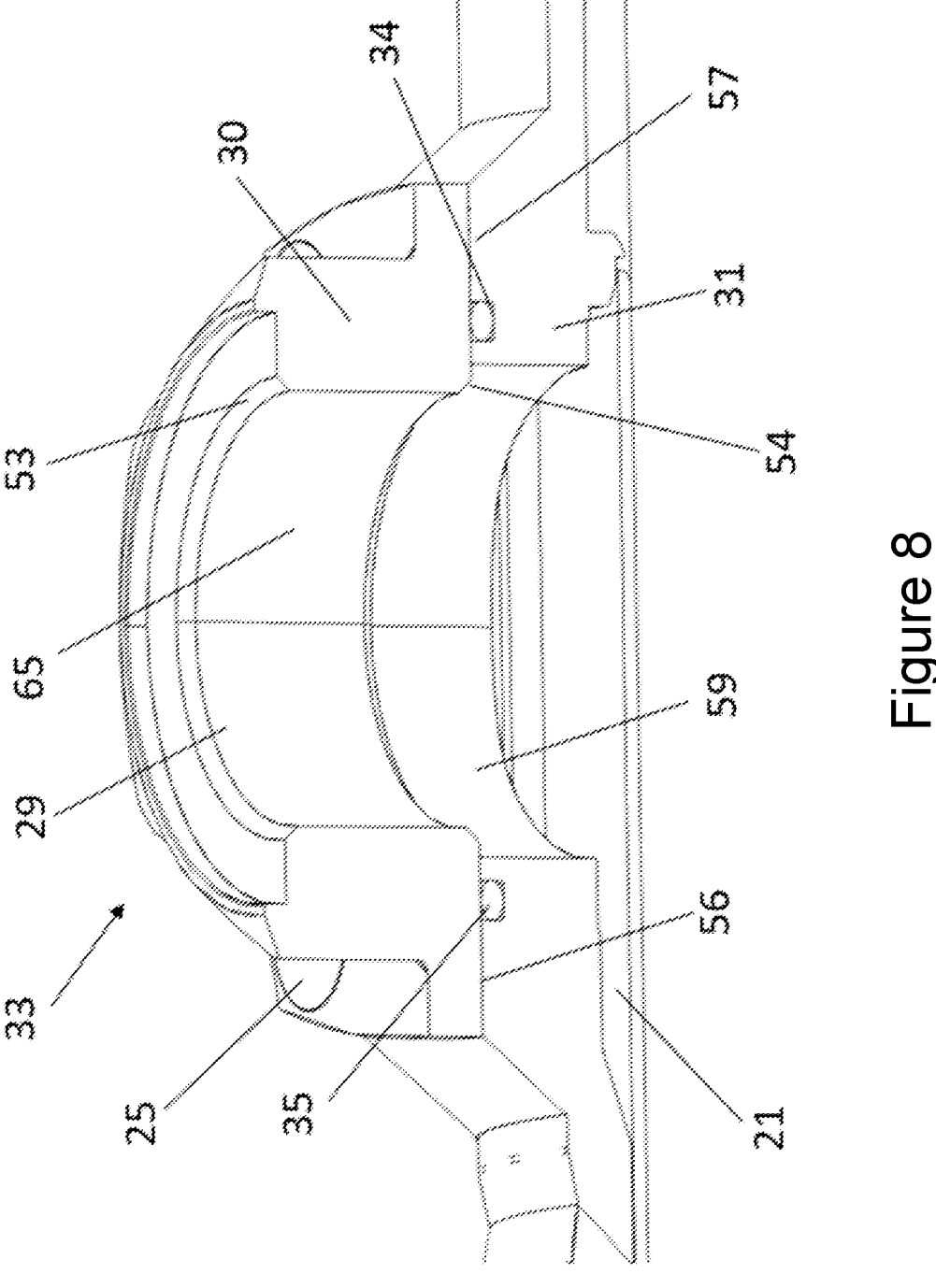
FIG. 8 is a cross-sectional perspective view of a port assembly of a membrane module according to the present invention.
Figure 9:
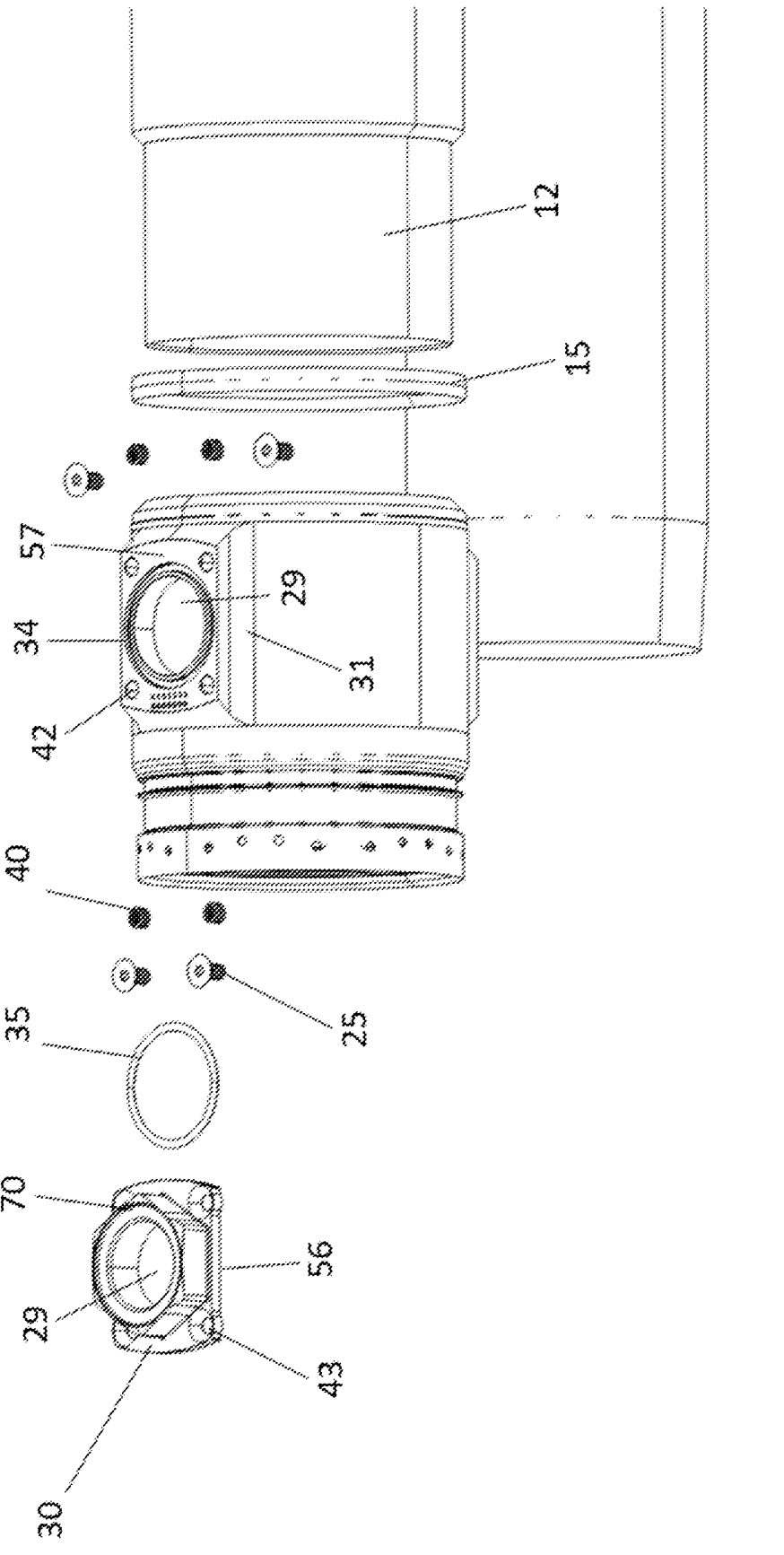
FIG. 9 is a perspective exploded view of an illustrative example of a membrane module according to the present invention.

FIG. 7 shows a top plan view of a port assembly of a membrane module. FIGS. 8 and 9 show a cross-sectional perspective view of a port assembly of a membrane module and a perspective exploded view of a membrane module, respectively. The port assembly 33 includes an upper port aperture portion 30 secured to a lower port aperture portion 31. The lower port aperture portion 31 comprises a lower face 57 oriented substantially parallel to the longitudinal axis and surrounding the port aperture 29. The upper port aperture portion 30 comprises an upper face 56 extending substantially parallel to the longitudinal axis and co-planar to the lower face 57 of the lower port aperture portion 31. In the illustrative example, an o-ring recess 34 is disposed in the lower face 57 of the lower port aperture portion 31, such that the o-ring recess 34 is located radially outwardly from the port aperture 29 and surrounds the port aperture 29. The o-ring recess may be disposed in the upper face 56 of the upper port aperture portion 30 in other examples. An o-ring 35 is disposed partially within and protrudes from the o-ring recess 34. At least one fastener 25 is adapted to draw the upper face 56 toward the lower face 57 and secure the upper face 56 to the lower face 57, thereby causing the o-ring 35 to be pressed against the other of the upper face 56 and the lower face 57 around an entire perimeter of the o-ring recess 34, creating a seal between the upper port aperture portion 30 and the lower port aperture portion 31.

The at least one fastener may comprise a plurality of fasteners 25. In the illustrative example, the upper face 56 includes a plurality of upper fastener apertures 43 extending therethrough, and the lower face 57 includes a plurality of lower fastener apertures 42 extending at least partially therethrough. Each of the plurality of fasteners 25 is located radially outwardly from the port aperture 29, extends through one aperture of the plurality of upper fastener apertures 43, and extends into one aperture of the plurality of lower fastener apertures 42. In the illustrative example, each of the plurality of lower fastener apertures 42 and each of the plurality of fasteners 25 is threaded. The upper fastener apertures 43 may also be threaded. Threaded fasteners 25 may allow for removable securement of the upper port aperture portion 30 to the lower port aperture portion 31, which allows the two to be easily separated in order to replace an o-ring 35 or otherwise inspect or repair the shell-side port assembly 33. Other illustrative examples may include non-threaded fasteners 25, such as rivets, for example, and any suitable fastener 25 may be utilized. In the illustrative example, four fasteners 25 are utilized, but greater or fewer may be utilized in other examples. In one example, at least three fasteners 25 are utilized. Further, in the illustrative example, the fasteners 25 extend through helical inserts 40 which may provide proper spacing, structural support, and/or improved retention.

In the illustrative example, the upper port aperture portion 30 has a diameter that is less than a diameter of the lower port aperture portion 31. Further, the lower port aperture portion 31 has a uniform diameter which, along with its larger diameter with respect to the diameter of the upper port aperture portion 30, allows for the use of lower pressure sweep gas when using the shell-side port assembly 33 as a sweep gas inlet, thus increasing overall performance of the membrane module 10. Further, in the illustrative example, the upper port aperture portion 30 comprises an upper beveled edge 53, a lower beveled edge 54, and a middle portion 65 between the upper beveled edge 53 and the lower beveled edge 54, wherein the middle portion 65 has a uniform diameter. Additionally, as shown in FIG. 9, an upper perimeter portion 70 of the upper port aperture portion 30 includes a hexagonal perimeter, which allows it to engage a hexagonal fastener driver for ease of handling.

While primarily discussed herein as being utilized in the context of a membrane module 10, the at least one shell-side port assembly 33 may be utilized with any vessel that includes at least one sidewall, at least one end wall, and at least one interior volume bound by the at least one sidewall and the at least one end wall, such that the port aperture 29 of the shell-side port assembly 33 is in fluid flow communication with the at least one interior volume of the vessel.

As such, an invention has been disclosed in terms of illustrative embodiments and alternate embodiments thereof. Of course, various changes, modifications, and alterations from the teachings of the present invention may be contemplated by those skilled) in the art without departing from the intended spirit and scope thereof. It is intended that the present invention only be limited by the terms of the appended claims.

The invention claimed is:

1. A membrane module comprising:
a shell assembly including a tubular shell having a first end, a second end, and a longitudinal axis extending between the first end and the second end, a feed end tubesheet connected to the first end of the shell, and a product end tubesheet connected to the second end of the shell;
a fiber bundle disposed within the shell, the fiber bundle comprising a plurality of hollow fibers extending through the feed end tubesheet and the product end tubesheet;
a feed inlet in fluid flow communication with the plurality of hollow fibers through the feed end tubesheet, the feed inlet and the feed end tubesheet being adapted to force a fluid entering the feed inlet through the plurality of hollow fibers to separate the fluid into a slow gas-rich non-permeate fluid and a fast gas-rich permeate fluid;
a product outlet in fluid flow communication with the plurality of hollow fibers through the product end tubesheet, the product outlet adapted to receive the slow gas-rich non-permeate fluid that flows through the plurality of hollow fibers;
a shell space located internal to the shell and external to the plurality of hollow fibers, the shell space extending between the feed end tubesheet and the product end tubesheet, the shell space adapted to receive the fast gas-rich permeate fluid that permeates through a plurality of fiber walls of the plurality of hollow fibers;
at least one shell-side port assembly disposed on an outer wall of the shell between the feed end tubesheet and the product end tubesheet, the at least one shell-side port assembly being in fluid flow communication with the shell space;
each of the at least one shell-side port assembly comprising a port aperture extending substantially perpendicular to the longitudinal axis and comprising a lower port aperture portion and an upper port aperture portion, the port aperture extending through the upper port aperture portion and the lower port aperture portion;

the lower port aperture portion comprising a lower face oriented substantially parallel to the longitudinal axis and surrounding the port aperture;
the upper port aperture portion comprising an upper face extending substantially parallel to the longitudinal axis and co-planar to the lower face;
an o-ring recess disposed in one of the lower face or the upper face, the o-ring recess being located radially outwardly from the port aperture and surrounding the port aperture;
an o-ring disposed in and protruding from the o-ring recess; and
at least one fastener that is adapted to draw the upper face toward the lower face and secure the upper face to the lower face, thereby causing the o-ring to be pressed against the other of the upper face and the lower face around an entire perimeter of the o-ring recess.

2. The membrane module of claim 1, wherein the at least one fastener comprises a plurality of fasteners.

3. The membrane module of claim 2, wherein the upper face includes a plurality of upper fastener apertures extending therethrough, and the lower face includes a plurality of lower fastener apertures extending at least partially therethrough, wherein each of the plurality of fasteners is located radially outwardly from the port aperture, extends through one of a plurality of upper fastener apertures, and extends into one of the plurality of lower fastener apertures.

4. The membrane module of claim 2, wherein each of the plurality of lower fastener apertures and each of the plurality of fasteners is threaded.

5. The membrane module of claim 2, wherein the plurality of fasteners comprises at least three fasteners.

6. The membrane module of claim 1, wherein the at least one shell-side port assembly is disposed inboard of at least one end cap of the shell assembly.

7. The membrane module of claim 1, wherein the at least one shell-side port assembly comprises a pair of shell-side port assemblies.

8. The membrane module of claim 1, wherein the at least one shell-side port assembly is disposed proximal to the feed end tubesheet in relation to the product end tubesheet.

9. The membrane module of claim 1, wherein the at least one shell-side port assembly is disposed proximal to the product end tubesheet in relation to the feed end tubesheet.

10. The membrane module of claim 1, wherein the at least one shell-side port assembly is adapted to provide an inlet for receiving a sweep gas therethrough.

11. The membrane module of claim 1, wherein the at least one shell-side port assembly is adapted to provide an outlet for the fast gas-rich permeate fluid that permeates through a plurality of fiber walls of the plurality of hollow fibers.

12. The membrane module of claim 1, wherein the upper port aperture portion has a diameter that is less than a diameter of the lower port aperture portion.

13. The membrane module of claim 1, wherein the upper port aperture portion comprises an upper beveled edge, a lower beveled edge, and a middle portion between the upper beveled edge and the lower beveled edge, wherein the middle portion has a uniform diameter.

14. The membrane module of claim 1, wherein the shell assembly is tubular.

15. The membrane module of claim 1, wherein the lower port aperture portion comprises an o-ring recess inner wall that separates the port aperture from the o-ring recess.

16. The membrane module of claim 1, wherein the upper face extends radially inwardly beyond the o-ring recess.

17. The membrane module of claim 1, wherein the upper port aperture portion having a first diameter and the lower port aperture portion having a second diameter that is larger than the first diameter.

18. A port assembly adapted for use with a membrane module, the membrane module having a tubular shell having a first end, a second end, and a longitudinal axis extending between the first end and the second end, and at least one interior volume, the port assembly comprising:

a port aperture extending substantially perpendicular to the longitudinal axis and comprising a lower port aperture portion and an upper port aperture portion, the port aperture extending through the upper port aperture portion and the lower port aperture portion, the lower port aperture portion comprising a lower face oriented substantially parallel to the longitudinal axis and surrounding the port aperture, the upper port aperture portion comprising an upper face extending substantially parallel to the longitudinal axis and co-planar to the lower face;

an o-ring recess disposed in either one of the lower face or the upper face, the o-ring recess being located radially outwardly from the port aperture and surrounding the port aperture;

an o-ring disposed in and protruding from the o-ring recess; and at least one fastener adapted to draw the upper face toward the lower face and secure the upper face to the lower face, thereby causing the o-ring to be pressed against the other of the upper face and the lower face around an entire perimeter of the o-ring recess;

wherein the port assembly is disposed on the shell and is fluid flow communication with the at least one interior volume.

19. The port assembly of claim 18, wherein the at least one fastener comprises a plurality of fasteners.

20. The port assembly of claim 19, wherein the upper face includes a plurality of upper fastener apertures extending therethrough, and the lower face includes a plurality of lower fastener apertures extending at least partially therethrough, wherein each of the plurality of fasteners is located radially outwardly from the port aperture, extends through one of the plurality of upper fastener apertures, and extends into one of the plurality of lower fastener apertures.

\* \* \* \* \*